UNITED STATES PATENT OFFICE.

ALFRED GENTHE, OF GOSLAR, GERMANY.

PROCESS OF MANUFACTURING LINOXYN AND LIKE PRODUCTS ESPECIALLY INTENDED FOR UTILIZATION IN THE LINOLEUM MANUFACTURE.

986,562.

Specification of Letters Patent. Patented Mar. 14, 1911.

No Drawing. Application filed February 1, 1909. Serial No. 475,486.

*To all whom it may concern:*

Be it known that I, ALFRED GENTHE, a subject of the German Emperor, and resident of Goslar, Germany, have invented a certain new and useful Improved Process of Manufacturing Linoxyn and Like Products Especially Intended for Utilization in the Linoleum Manufacture, of which the following is a specification.

Two different methods have been chiefly in use so far for producing linoxyn. One of these methods, more generally applied, known as the "Walton process" consists in wetting a thin tissue with linseed-oil or varnish and allowing the such formed coating to oxidize and to stiffen. The stiffening of this first layer having taken place, liquid varnish is again spread upon it and this new coating of varnish is again allowed to stiffen, this proceeding being repeated many times until a solid coating of sufficient thickness is adhering to the tissue. The linoxyn is well adapted for use in the manufacture of linoleum and like products. The process described has however the inconvenience of requiring a very long time (about 4 months) for carrying it through, trials have been made to accelerate the course of the proceeding and endeavors in that line resulted in the so-called quick processes. These quick-processes are essentially based upon an acceleration of the oxidizing process undergone by the linseed-oil by means of blowing air into the mass of oil. Though a solid linoxyn be also obtained in this manner, the quality of the product is sensibly inferior to that yielded by the Walton (sometimes called the scrim) process, as the linoleum produced by the quick processes becomes easily cracked. Now the inventor of the process forming the object of the present invention has found out that the inferior quality of the linoxyn obtained by the quick processes is to be ascribed to the following facts: The Walton linoxyn is not a chemically homogeneous mass, it merely represents a colloidal solution of linoxyn in varnish, whereas the linoxyn obtained by the quick processes is homogeneous, *i. e.* consists of linseed-oil which is oxidized in a perfectly uniform manner. It is from this colloidal state of the Walton linoxyn that its specific properties are derived.

The present invention has for its object to convert the linoxyn of inferior quality obtained by any quick process into a colloidal or swelled state, thus imparting to it the superior quality of the product obtained by the Walton (or scrim) process.

The invention consists in intermingling such inferior linoxyn with linseed oil, this having for its effect the production of a kind of swelled mass or colloidal solution. The mixing of the linoxyn with the linseed oil may be carried out in any suitable manner, for instance in a kneading machine. The proportion of the materials to be mixed together may be 100 parts of linoxyn obtained by any quick process and from 5 to 20 parts of linseed oil. The mixing operation takes place at the ordinary temperature of the atmosphere. In some cases, it may be advisable to raise the temperature somewhat, say to from 50° to 80° centigrade in order to accelerate and facilitate the mixing operation. It is advantageous to provide working conditions allowing a further absorption of oxygen by the product.

Other oils than linseed oil, or varnish, may be made use of and the process is also applicable in the manufacture of oiled cloth and the like.

Having now fully described my said invention, what I claim and desire to secure by Letters Patent is:—

1. In the manufacture of linoxyn, the process which consists in mixing a drying oil with linoxyn obtained by any quick process so as to obtain a colloidal solution, the proportions being from 5 to 20 parts of a drying oil to 100 parts of linoxyn, whereby linoxyn having qualities similar to the linoxyn obtained by the scrim process is produced.

2. The process of manufacturing linoxyn having qualities similar to the linoxyn obtained by the scrim process, consisting in mixing linseed oil with linoxyn obtained by any quick process so as to obtain a colloidal solution, the proportions being from 5 to 20 parts of linseed oil to 100 parts of linoxyn.

3. The process of manufacturing oil products, which consists in mixing a drying oil with a previously stiffened and oxidized oil, so as to obtain a colloidal solution, the proportion being approximately from 5 to 20 parts of a drying oil to a hundred parts of the solid oil product.

4. The process of manufacturing linoxyn, which consists in mixing oil with linoxyn obtained by any quick process so as to obtain a colloidal solution, the proportion being approximately from 5 to 20 parts of oil to a hundred parts of linoxyn.

5. The process of manufacturing linoxyn, which consists in mixing varnish with linoxyn obtained by any quick process so as to obtain a colloidal solution, the proportion being approximately from 5 to 20 parts of varnish to a hundred parts of the linoxyn.

6. The process of manufacturing oil products which consists in mixing a drying oil with a colloidal solution, the proportion being approximately from 5 to 20 parts of a drying oil to a hundred parts of the colloidal solution, and allowing further absorption of oxygen by the product.

In testimony whereof I have hereunto set my hand in presence of two witnesses.

ALFRED GENTHE.

Witnesses:
 JEAN GRUND,
 CARL GRUND.